(No Model.)
J. F. STEWARD.
DRILL CHUCK.
No. 455,477. Patented July 7, 1891.
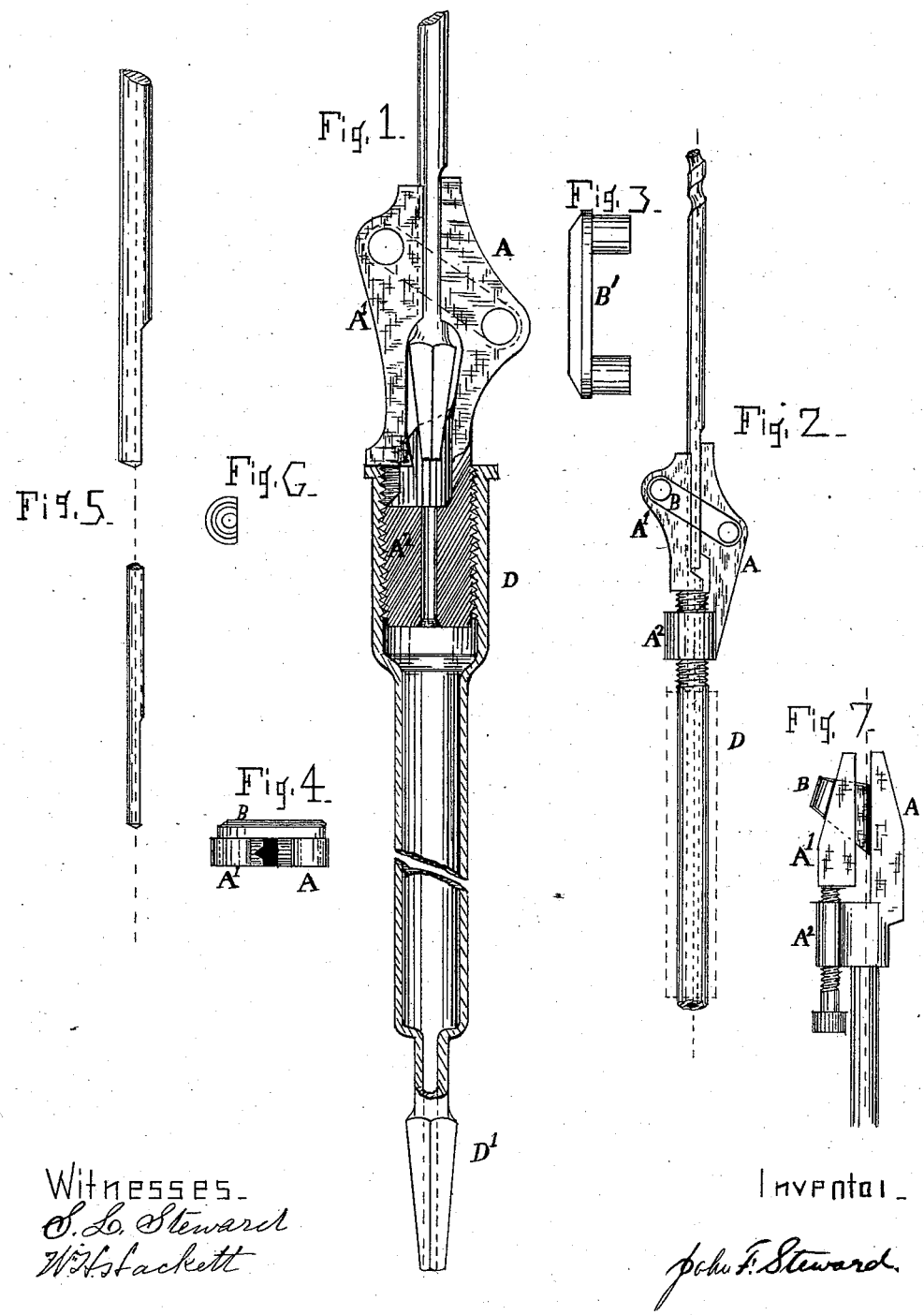
Witnesses
S. L. Steward
W. H. Sackett
Inventor
John F. Steward

UNITED STATES PATENT OFFICE.

JOHN F. STEWARD, OF CHICAGO, ILLINOIS.

DRILL-CHUCK.

SPECIFICATION forming part of Letters Patent No. 455,477, dated July 7, 1891.

Application filed August 2, 1890. Serial No. 360,836. (No model.)

*To all whom it may concern:*

Be it known that I, JOHN F. STEWARD, of Chicago, in the county of Cook and State of Illinois, have invented certain new and useful Improvements in Drill-Chucks, of which the following is a full description, reference being had to the accompanying drawings, in which—

Figure 1 is a side view, partly in section; Fig. 2, a side view; and Fig. 3 is a side view of the link which connects the jaws of the chuck. Fig. 4 is an end view of the jaws of the chuck, also the connecting-link in its position relative to the jaws. Fig. 5 shows the best form which drill-shanks may be given to be best held. Fig. 6 may be considered as representing an end view of several drill-shanks of different sizes, and cut away on one side to within a given distance from the axis of rotation, in order that they may run true. Fig. 7 may be considered as illustrating means the equivalent of the pivoted link for causing the longitudinal movement of the movable jaw to cause it to also approach the fixed jaw. I prefer the linking device and shall embody it in various claims.

The invention consists, essentially, in the arrangement of a fixed jaw as one piece with a hub which is so threaded that the arbor provided for the chuck (on which arbor, or in the eye of which arbor, a thread is formed) is adapted to be thrust against the rear end of the movable jaw, so that the space between the two jaws shall be decreased and the drill held between, said jaws being properly held relative to each other. I do not limit myself, however, to the actual use of the arbor as means for forcing the jaws so as to make them approach each other relatively, because a special screw, as shown in Fig. 7, is clearly the equivalent thereof.

A is a fixed jaw, having a threaded hub A².

A' is a movable jaw, having a grooved face, as shown in Fig. 4. The rear end of the jaw is so shaped that the arbor or other suitable screw may be forced against it.

B is means for connecting the two jaws so that they shall be held in proper relative position to each other, preferably a link, as shown in Figs. 1, 2, 3, and 4. The periphery of the hub may be threaded, as shown in Fig. 1, or the eye of the same, as shown in Fig. 2, the arbor, of course, fitted to correspond.

As shown in the main figure, my device is adapted to hold carpenters' bits as well as drills, merely by shaping the jaws so as to permit the squared end to be received. In order that the tools held may run true, whatever the size of the shank, I flatten said shank on one side to within a definite distance from the center, the distance being determined by the distance that the face of the jaw A is from the axis of rotation. To make my chuck serve also as a pin-vise, I make the arbor large enough to be held in the hand with convenience. A small arbor may be enlarged by applying a wooden cylinder, as shown in Fig. 2 by dotted lines.

It is desirable to provide an extension to carpenters' braces, in order to reach to distant places to bore holes, and also to adapt them to take straight-shank drills. For this purpose I square the lower end of the arbor, as shown in Fig. 1. With a longitudinal hole through the squared part, the tool still serves as a pin-vise.

What I claim is—

1. The screw D, the jaw A, provided with the hub A², and the jaw A', the latter adapted to be moved by the screw in a longitudinal direction relatively to the jaw A, and by such longitudinal movement, through the instrumentality of the connecting-link, be caused to approach the said jaw A, and the drill, when placed between, be held, all combined substantially as described.

2. The combination of the jaw A, having the hub A², the arbor D, threaded to the hub of said stationary jaw, the jaw A', the said jaw adapted to receive the pressure of the end of the threaded arbor, the two said jaws connected by suitable mechanism, as the link B, whereby the longitudinal movement of the jaw A' under the pressure of the screw-arbor is forced upon the tool placed between the said jaws, substantially as described.

3. The jaw A, having the threaded hub, the threaded arbor, the jaw A', and the pivoted link B, all combined substantially as described.

4. The jaw A, having the threaded hub, the threaded arbor, the jaw A', and suitable connecting mechanism for controlling the movable jaw and holding it relative to the stationary jaw, said connecting mechanism upon one side of the jaws only, so that the space for the drill or other tool to be held is accessible from the side, whereby the said tool may be placed sidewise therein, all combined substantially as described.

5. The combination of the stationary jaw having the threaded hub, the threaded arbor, the movable jaw A', and suitable linking mechanism connecting said jaws, one of said jaws fluted and the other having a plane face, substantially as described.

6. The combination of the jaw A, having the perforated and threaded hub, the movable jaw A', and the hollow threaded arbor, adapted by a rotary motion to cause the jaw A' to have a longitudinal movement relative to the stationary jaw, whereby the chuck is adapted to serve the purpose of a pin-vise, substantially as described.

7. The stationary jaw A, having the threaded hub $A^2$, the threaded arbor, the jaw A', and suitable mechanism connecting the said jaws for the purposes set forth, the said arbor hollow and its lower end adapted to be grasped by a bit-brace or other suitable tool-rotating device, substantially as described.

8. The jaw A, having the threaded hub $A^2$, the jaw A', the said jaws connected so as to operate substantially as set forth, and the threaded arbor, the jaw A having a holding-face parallel with the axis of rotation of said arbor and substantially tangent to the smallest drill to be held, when the latter is so placed that its axis shall substantially coincide with the axis of the arbor, and the larger drills flattened upon one side of the shanks to within a distance equal to the radius of the smallest tool to be held, all combined substantially as described.

JOHN F. STEWARD.

Witnesses:
S. L. STEWARD,
W. H. HACKETT.